United States Patent Office 3,090,091
Patented May 21, 1963

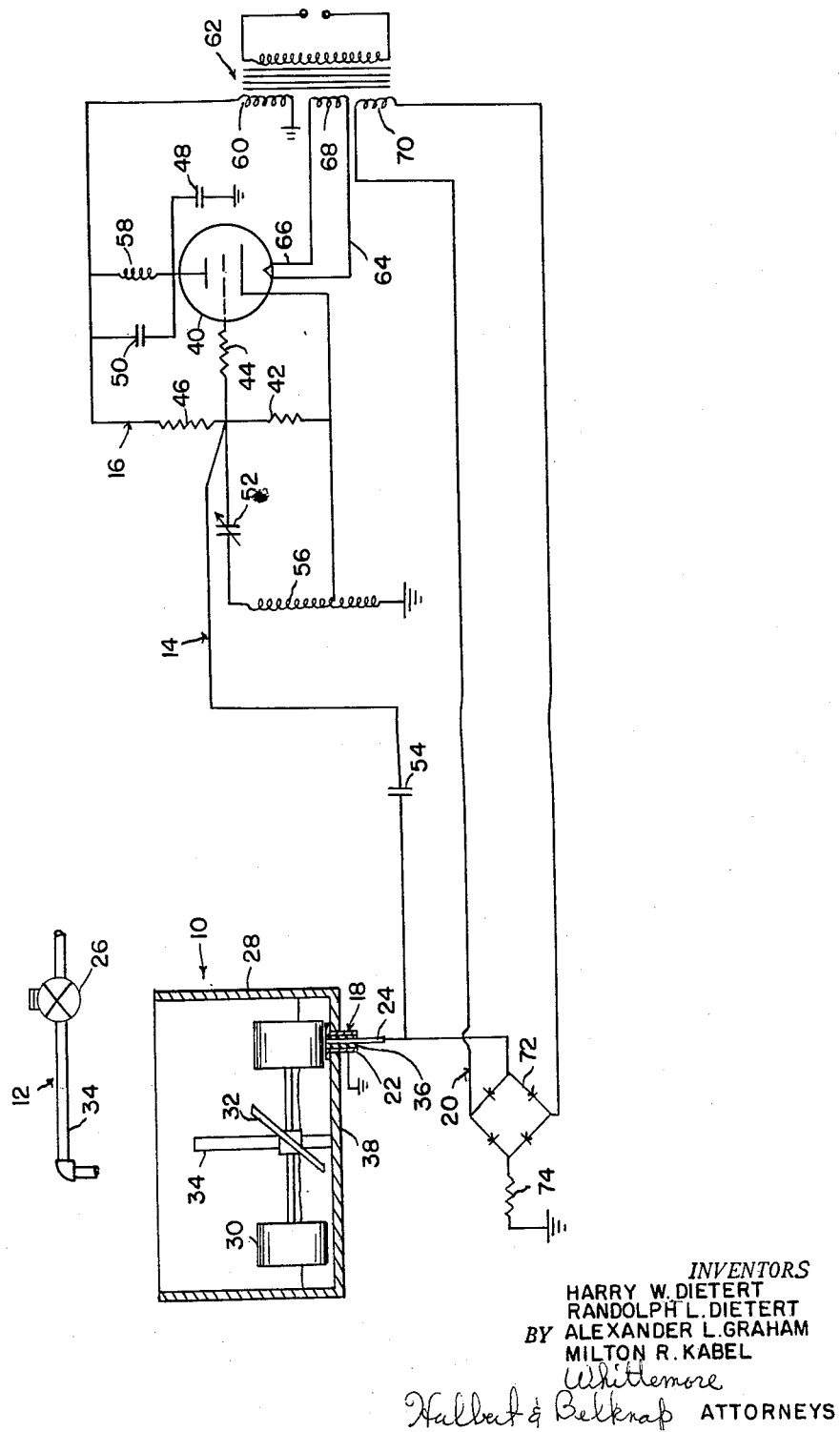

3,090,091
APPARATUS FOR ELECTRICAL MOISTURE MEASUREMENT
Harry W. Dietert, Kerrville, Tex., and Randolph L. Dietert, Alexander L. Graham, and Milton R. Kabel, Detroit, Mich., assignors to Harry W. Dietert Co., Detroit, Mich., a corporation of Michigan
Filed Aug. 8, 1960, Ser. No. 48,065
5 Claims. (Cl. 22—89)

The invention relates to improvements in electrical moisture measurement and refers more specifically to apparatus for sensing the moisture content of a granular material which is substantially unaffected by the history of use of the granular material.

It is an object of the present invention to provide apparatus for measuring moisture content of granular material which apparatus is substantially unaffected by the history of use of the granular material.

Another object is to provide moisture sensing means including a probe having a pair of electrodes and means for producing a direct electric potential therebetween.

Another object is to provide a mill for mixing granular material including means for providing an electric potential between the granular material and the mill.

More specifically it is an object to provide apparatus for automatically controlling the moisture content of granular material comprising a mill for mixing the granular material, means responsive to an electric signal for supplying moisture to the granular material in the mill, a probe inserted within the mill for sensing the moisture content of the granular material therein, said probe having a pair of electrodes exposed to the granular material in the mill, an electrical circuit connected to the probe for producing an electric signal to control the moisture supply means, and means for providing an electric potential between the electrodes of the probe.

Another object is to provide apparatus for controlling the moisture content of granular material as set forth above wherein said electric potential is a direct voltage of less than forty volts.

Another object is to provide apparatus for controlling the moisture content of granular material as set forth above which is simple in construction, economical to manufacture and efficient in use.

Other objects and features of the invention will become apparent as the description proceeds, especially when taken in conjunction with the accompanying drawing, illustrating a preferred embodiment of the invention, wherein:

The FIGURE is a partly diagrammatic, partly schematic representation of means for controlling the moisture content of granular material in accordance with the invention.

With particular reference to the figure a specific embodiment of the invention will now be disclosed.

The apparatus for controlling the moisture content of granular material illustrated in the figure comprises a mill 10 in which the granular material is mixed, automatically controlled moisture supply means 12, and electronic means 14 operable to develop an electric signal on the moisture content of granular material within the mill 10 reaching a predetermined percent for controlling the operation of the moisture supply means 12. The electronic circuit 14 includes oscillator circuit 16, moisture sensitive probe 18, and biasing means 20 for developing a bias signal between the electrodes 22 and 24 of probe 18.

As granular material is mixed in the mill 10 moisture is added thereto from moisture supply means 12. The moisture content of the granular material is periodically sensed by the probe 18. When the moisture content of the granular material reaches a predetermined percent as sensed by the probe 18 oscillator 16 will be caused to produce an electric signal to operate the valve 26 in the moisture supply means, thereby controlling the moisture content of the granular material within the mill 10.

The bias means 20 is provided to produce an electric potential between the electrodes 22 and 24 of the probe 18 so that oscillation of oscillator 16 will be produced when the granular material within the mill has a predetermined moisture content regardless of the history of use of the granular material.

More specifically the mill 10 comprises a container 28 into which granular material is placed for mixing. The mill 10 further includes rollers 30 and plows 32 rotatably mounted on shaft 34 at right angles to each other as shown. On rotation of shaft 34 rollers 30 and scrapers 32 mix the granular material within the container 28 and alternately compress the granular material against the probe 18 and scrape the granular material therefrom.

Moisture supply means 12 comprises a moisture conduit 34 extending from a moisture supply (not shown) to a position over container 28 into which the conduit 34 empties. A solenoid operated valve 26 is included in conduit 34 for controlling the quantity of moisture added to the granular material during mixing thereof.

Probe 18 comprises a pair of electrodes 22 and 24 separated from each other by insulating material 36 and positioned in the bottom 38 of the container 28. Probe 18 is so constructed and positioned that granular material within the container 28 is periodically pressed against the exposed electrodes 22 and 24 within the container 28 by rollers 30 on rotation of shaft 34. The impedance of probe 18 is thus proportional to the moisture content of the granular material within the container 28.

Oscillator 16 includes tube 40, resistors 42, 44 and 46, capacitors 48, 50, 52 and 54, inductance 56, relay coil 58, the secondary winding 60 of power transformer 62, heater circuit 64 including heater 66 and the secondary winding 68 of power transformer 62, and probe 18. The components of the oscillator circuit 16 are so chosen to produce a current through relay coil 58 on the moisture content of the granular material within the container 28 reaching a predetermined percent as sensed by probe 18 as will be understood by those familiar with the art. The current through coil 58 is operable to actuate the solenoid operated valve 26 in the moisture supply means 12 to control the moisture content of the granular material within the mill 10.

The bias means 20 comprises the secondary winding 70 of the power transformer 62, the rectifier 72 and current limiting resistor 74. The output of the rectifier 72 as will be understood is a direct voltage and as shown is applied between the electrodes 22 and 24 of the probe 18.

In accordance with the invention the bias voltage developed by rectifier 72 is applied between the electrodes 22 and 24 of the probe 18 to provide accurate sensing of the moisture content of the granular material within the container 28 by the probe 18 regardless of the history of use of the granular material. That is to say, without the bias voltage granular material which is remixed immediately after being subject to high heat and magnetic apparatus used in foundry operations will provide a different moisture content indication as sensed by probe 18 from granular material which has set for a substantial period of time such as overnight before being conditioned in the mill 10.

The exact cause of the differences in moisture content of granular material as sensed by probe 18 before and after the granular material has set for a period after being used in a foundry operation as indicated by the sample readings set forth in the chart below is not entirely understood. The results of many tests however are conclusive and show that the moisture content of granular material mixed in a mill 10 will be higher when all the sand used in the mill has been allowed to set and dry out for a period than when the granular material is partly sand which has been allowed to set and dry out and partly sand which has not been allowed to set for a substantial period of time after use in a foundry operation when no bias voltage is applied to probe 18.

As shown in the chart below granular material which has been allowed to set and dry out for a substantial period before being mixed in mill 10 will have a moisture content of .31% more than the moisture content of granular material which is composed of one-third granular material which has been allowed to set and dry out and two-thirds of granular material which is reused substantially immediately which is also mixed in mill 10 if no bias is applied to the probe 18.

With a direct voltage bias of approximately eighteen volts applied to the probe 18 the moisture content of the granular material mixed in the mill 10 is substantially constant regardless of whether the material has set and dried out for a substantial period or has been reused substantially immediately. Thus it will be evident that the provision of a bias between the electrodes 22 and 24 of the probe 18 which places an electrical potential between the container 28 and the granular material therein aids in the producing of granular material having a predetermined moisture content which is essential in foundry operations.

| Sample | Tested moisture, percent | | Kind of granular material |
|---|---|---|---|
| | Bias | No bias | |
| 1 | 5.0 | 4.51 | All dry sand. |
| 2 | 5.0 | 4.2 | One-third allowed to dry out. Two-thirds reused immediately. |
| 3 | 5.0 | 4.2 | Do. |

Two theories of the action of the bias voltage when applied as indicated above are considered possible. Both or neither of these theories may be correct explanations of the results obtained which are set forth above. First, it is considered that due to the heating of the reused granular material in the foundry process that migratory electrons are produced within the granular material which will effect the moisture content of the granular material as sensed by the probe 18 if they are not given sufficient time to migrate to the container where they are neutralized. Second, it may be considered that when the granular material is dried out, additional time is required to dissolve the electrolytes present and get them into solution as ions. When the electrolytes are present as ions in solution in the water, the conductivity of the water will be higher, thereby changing the impedance at the probe. Dry granular material will require more water in a short mixing cycle to attain the same impedance level than will granular material containing residual water in which the electrolytes are already dissolved. The bias voltage may be considered as a means of promoting the dissociation of electrolytes so that a unit of newly added water has the same electrical characteristics as a unit of residual water that has been in contact with the granular material for a substantial period of time.

Regardless of the exact scientific explanation of the phenomenon indicated above it is a fact that if a bias is placed between the electrodes of a probe 18 in a system such as that set forth that the moisture content of granular material mixed in the mill 10 will be substantially constant without regard to the history of use of the granular material. Without the bias the moisture content of granular material mixed in a mill 10, which granular material has not been allowed to set and dry out after being used in a foundry operation, will be lower than the moisture content of granular material mixed in the same mill which has been allowed to set and dry out for a substantial period.

With regard to the bias applied to the probe 18 it is believed that biases of between one and thirty volts are useful in conjunction with apparatus as disclosed above. Excellent results have been obtained with a bias voltage of approximately eighteen volts. The polarity of the direct voltage bias applied to probe 18 does not effect the constant moisture content results regardless of granular material use history as set forth above. Adjustment is however necessary to provide a specific constant moisture content with bias voltages of different polarity.

The drawings and the foregoing specification constitute a description of the improvement in electrical moisture measurement in such full, clear, concise and exact terms as to enable any person skilled in the art to practice the invention, the scope of which is indicated by the appended claims.

What we claim as our invention is:

1. Apparatus for controlling the moisture content of granular material, comprising a mill for mixing the granular material, means for adding moisture to the granular material, a probe mounted in said mill including a pair of electrodes electrically insulated from each other and exposed to granular material within the mill for sensing the moisture content of the granular material, means connected to the electrodes for developing an alternating control signal between the pair of electrodes representative of the sensed moisture content, means for controlling said means for adding moisture to the granular material in accordance with the control signal developed, and means connected to the electrodes for producing a unidirectional electric potential difference between said electrodes.

2. Apparatus for controlling the moisture content of granular material, comprising a mill for mixing the granular material, means operable in response to an electric signal representative of the moisture content of the granular material for adding moisture to the granular material, an oscillator circuit for developing an electric signal representative of the moisture content of the granular material for controlling the means for adding moisture to the granular material and including a probe for sensing the moisture content of the granular material, said probe including a pair of electrodes electrically insulated from each other and exposed to the granular material within said mill and an oscillator connected to said electrodes for developing an alternating electric signal between said electrodes, and separate means connected to said electrodes for producing unidirectional voltage difference between said electrodes.

3. Apparatus for controlling the moisture content of granular material, comprising a mill for mixing the granular material, means operable in response to an electric signal representative of the moisture content of the granular material for adding moisture to the granular material, an oscillator circuit for developing an electric signal representative of the moisture content of the granular material for controlling the means for adding moisture to the granular material and including a probe for sensing the moisture content of the granular material, said probe including a pair of electrodes electrically insulated from each other and exposed to the granular material within said mill and an oscillator connected to said electrodes for developing an alternating electric signal between said electrodes, and means connected to said electrodes for producing a unidirectional voltage difference of between one and thirty volts between said electrodes.

4. Apparatus for controlling the moisture content of granular material, comprising a mill for mixing the granular material, means operable in response to an electric signal representative of the moisture content of the granular material for adding moisture to the granular material, an oscillator circuit for developing an electric signal representative of the moisture content of the granular material for controlling the means for adding moisture to the granular material and including a probe for sensing the moisture content of the granular material, said probe including a pair of electrodes electrically insulated from each other and exposed to the granular material within said mill and an oscillator connected to said electrodes for developing an alternating electric signal between said electrodes, and separate means connected to said electrodes for producing a voltage difference of approximately twenty volts between said electrodes.

5. Apparatus for controlling the moisture content of granular material, comprising a mill for mixing the granular material, means operable in response to an electric signal representative of the moisture content of the granular material for adding moisture to the granular material, a circuit for developing an electric signal representative of the moisture content of the granular material for controlling the means for adding moisture to the granular material including a probe for sensing the moisture content of the granular material having a pair of electrodes electrically insulated from each other and exposed to the granular material within said mill, an oscillator for developing an alternating electric potential, an alternating voltage source for actuating the oscillator, means connecting the alternating electric potential across the electrodes; and separate means connected between said electrodes for producing a unidirectional voltage difference between said electrodes whereby the moisture content of the granular material sensed by the probe is constant without regard to the history of use of the granular material.

References Cited in the file of this patent

UNITED STATES PATENTS

| | | |
|---|---|---|
| 2,508,540 | Riggen | May 23, 1950 |
| 2,673,327 | Morelock | Mar. 23, 1954 |
| 2,856,948 | Martin | Oct. 21, 1958 |
| 2,886,868 | Dietert | May 19, 1959 |
| 2,927,252 | Hartley | Mar. 1, 1960 |